March 2, 1965     D. O. GUNSON ETAL     3,172,079

STALL WARNING AND AUTOMATIC IGNITION SYSTEM FOR AIRCRAFT

Filed Sept. 26, 1962

*INVENTORS*
DAVID O. GUNSON
HAROLD A. VALERY
BY

United States Patent Office 3,172,079
Patented Mar. 2, 1965

3,172,079
STALL WARNING AND AUTOMATIC IGNITION SYSTEM FOR AIRCRAFT
David O. Gunson, Atlanta, and Harold A. Valery, Marietta, Ga., assignors to Lockheed Aircraft Corporation, Burbank, Calif.
Filed Sept. 26, 1962, Ser. No. 226,425
4 Claims. (Cl. 340—27)

This invention relates to a safety of flight control system for an aircraft, and more particularly a combined stall warning and automatic powerplant ignition system wherein the igniters on the aircraft powerplants are automatically activated upon approach of the aircraft into a stall attitude whereby the pilot is warned of the stall attitude and the activation of the igniter system on the powerplants will avoid engine flameouts.

Conventional stall warning systems have been known in the prior art wherein the approach of an aircraft into a stall attitude (such as when the pilot pulls excessively high angles of attack) can provide various types of signals to the pilot; i.e., a visual signal on the instrument panel such as a light, or a vibratory motion or shaking to the elevator control system, more commonly referred to as a stick shaker.

Despite this warning to the pilot, some turbo-jet powerplants have a tendency to stall out due to high altitude and/or high angles of attack, the tendency of the powerplants to stall or flameout being believed to occur from an insufficient and/or unstable airflow into the powerplant inlet which is caused by either or both the high angle of attack of the powerplant inlet relative to the moving airstream or from the location of the powerplant inlets behind a fuselage or a wing, and thus having the airflow blocked. The stall or flameout usually occurs over a predetermined altitude which is dependent upon the aircraft configuration involved due to the lower density of the rarified air. Accordingly, if it is desired to prevent ignition actuation at the lower altitudes with the more dense air, the automatic ignition portion of the system can be interconnected through an altitude switch whereby ignition actuation is only occasioned beyond or above any certain predetermined altitude.

By this arrangement, should the airflow through the engine become reduced to a point where an unstable air-fuel ratio occurs so that burning in the powerplant combustor is not self sufficient for the resulting unstable air-fuel mixture, actuation of the ignition system will sustain combustion until the aircraft reduces the nose high or stall attitude to a point where the airflow through the engine is sufficient for self sustained combustion.

Accordingly, it is an object of this invention to provide an aircraft system wherein automatic ignition control is initiated upon actuation of a stall warning system on the aircraft.

A further object of this invention is to provide an aircraft system having automatic ignition actuation which is automatically actuated through the aircraft stall warning system when the aircraft reaches a stall attitude above a predetermined altitude.

It is a still further object of this invention to provide an aircraft system having an automatic ignition actuating system for an aircraft operating through a stall warning system on the aircraft that contains relatively few and uncomplicated parts, and requiring relatively simple and easy maintenance.

Further objects and advantages of this invention will become apparent from the following description taken in connection with the accompanying drawings in which.

Generally stated, the invention consists of an aircraft stall warning system comprising an airstream direction sensing device feeding a signal into a stall signaling device capable of relaying or displaying stall warning information to the aircraft pilot. Interconnected and combined with the stall warning system is an automatic ignition actuation device which is activated by the stall warning signal so as to initiate the aircraft powerplant ignition system.

Arrangements are also provided whereby the actuation of the automatic ignition portion of the system can be limited to operation above a predetermined altitude, as well as the stall warning system can be arranged whereby the presentation or display of a stall warning signal is only accomplished when the aircraft is airborne.

Figure 1:
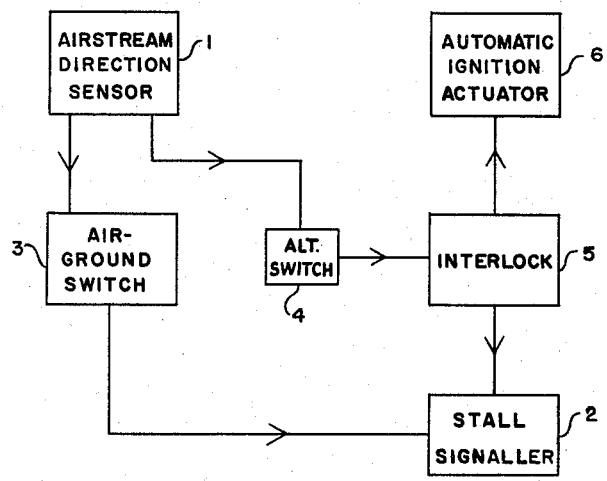
FIGURE 1 is a block diagram of one embodiment of this invention.

Referring more particularly to the drawings, in FIGURE 1 there is arranged in block diagram an airstream direction sensor 1 feeding a stall warning signal to a stall signaler 2 through an air-ground switch 3. A second signal path from airstream direction sensor 1 to stall signaler 2 is provided through an altitude switch 4 and an interlock 5; this signal path being arranged so that passage of the stall signal into interlock 5 will also transmit a signal to an automatic ignition actuator 6 as well as the stall signaler 2.

Figure 2:
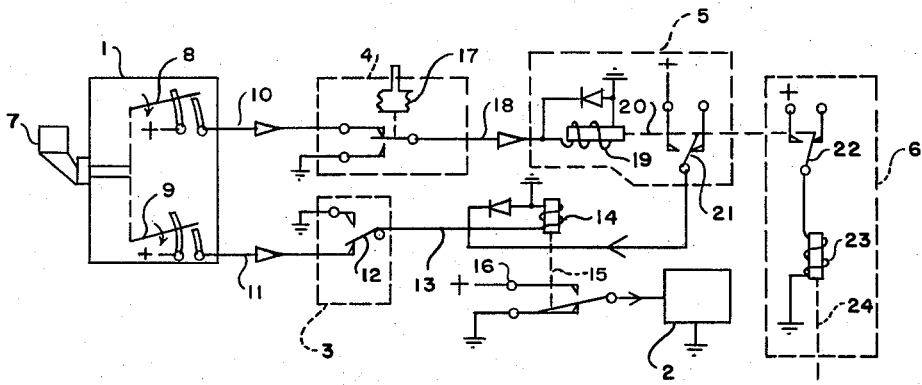
FIGURE 2 is an electrical schematic of the invention embodiment of FIGURE 1.

Referring now to FIGURE 2, the airstream direction sensor 1 comprises a vane 7 that is located exterior of the aircraft fuselage in a manner free to rotate about an axis normal to its point of location on the fuselage so as to indicate the relative angle of attack of the aircraft relative to a longitudinal reference of the aircraft, which in this instance could be normal level flight attitude. Rotation of vane 7 relative to the fuselage to indicate an increased angle of attack will move a pair of switch members 8 and 9 to supply power into lines 10 and 11, switch members 8 and 9 being arranged whereby the closing of the circuit to supply electrical power to lines 10 and 11 can occur at any predetermined angle of attack of the aircraft, it also further being understood that in the embodiment depicted in FIGURE 2, switch member 8 closes at an angle of attack less than necessary for the closure of the circuit by switch member 9, the purpose of which will be explained in more detail hereinafter.

The air-ground switch 3 contains a switch 12 to close the circuit between lines 11 and 13 when the aircraft is in the air, switch 12 interrupting the path between lines 11 and 13 when the aircraft is on the ground. This air-ground switch 3 is provided to prevent stall warning signals being generated while the aircraft is on the ground which can occur when thrust reversers are mounted on turbo-jet powerplants whereby the thrust is deflected forward and which could cause vane 7 to deflect sufficiently from its horizontal reference so as to initiate a stall warning signal. Power from line 13 flows through a relay coil 14 to operate relay 15 to close the circuit from power input 16 to stall signaler 2, which is actuated thereby, whether stall signaler 2 merely presents a visual indication on the pilot's control panel or physically shakes or vibrates his control column. Should the stall signal be presented by an actual vibration or shaking of the control column, the importance of an air-ground switch 3 can be seen, for with the inclusion of such a switch, vibration or shaking of the pilot's control column is prevented when the aircraft is taxing or operating on the ground.

Atitude switch 4 contains a switching mechanism operated through a bellows 17 for opening and closing the circuit between lines 10 and 18, which when the circuit is closed, provides power to a relay coil 19 for operating relay 20. Operation of relay 20 operates a switch 21 to supply current to relay coil 14 for operation of relay 15, thereby providing power to stall signaler 2. Also, relay 20 operates a switch 22 in automatic ignition actuator 6 to supply power to a relay coil 23 for actuation of relay 24 connected to the igniter system for the aircraft powerplants.

As indicated above, the invention embodiment depicted in FIGURE 2 is arranged to provide initiation of the powerplant ignition system only when the aircraft approaches a stall condition above an altitude predetermined by bellows 17, and it is to be appreciated that if initiation of the aircraft powerplant ignition system is desired at any altitude the depicted system can be modified to operate off of relay 15. Likewise, as previously pointed out above, it may desired for the aircraft to be placed into a greater angle of attack at lower altitudes before a stall warning signal is generated than at the higher altitudes with the less dense, rarified air, such as is provided for in the system depicted in FIGURE 2. On the other hand, if a stall warning signal is to be presented at any predetermined or said angle of attack for the aircraft, regardless of altitude, then switch member 8 can be eliminated whereby all actuating signals for the system are derived through the closing of a circuit by switch member 9.

As can thus be seen, there is provided by this invention a combined stall warning signal and automatic initiation of powerplant igniters in an aircraft in which the ignition initiation can be accomplished only above a predetermined or preset altitude. Also, it can be seen there is provided in this invention a system wherein a stall warning signal and initiation of powerplant igniters can be accomplished at different angles of attacks for the aircraft depending upon the altitude.

While only one particular embodiment has been illustrated and described, it will be apparent to those skilled in the art that various modifications and changes may be made without departing from the invention, and it is intended to cover in the appended claims all such changes and modifications that come within the true spirit and scope of the invention.

What is claimed is:

1. In combination in an aircraft having a gas turbine primary powerplant system with powerplant system ignition means,
   a stall warning system presenting a signal to the pilot when the aircraft reaches a predetermined angle of attack or greater,
   and control means for initiating operation of the powerplant system ignition means,
      said control means interconnected with the stall warning system and adapted whereupon generation of a stall warning signal automatically initiates operation of the powerplant system ignition means.

2. A combination as claimed in claim 1 including a switching means permitting operation of said control means and presentation of a stall warning signal when the aircraft is airborne.

3. A combination as claimed in claim 1 including an altitude responsive means controlling operation of said control means above a predetermined altitude.

4. A combination as claimed in claim 1 wherein said stall warning system is adapted to present said pilot signal upon a reduced aircraft angle of attack at altitudes above a predetermined level than the aircraft angle of attack below said predetermined altitude, and an altitude responsive means controlling presentation of said stall warning system pilot signal of reduced aircraft angle of attack only when the aircraft is above said predetermined altitude.

References Cited by the Examiner
UNITED STATES PATENTS 2,611,810  9/52  Greene _____ 340—27
2,665,860  1/54  Bancroft _____ 340—27 XR NEIL C. READ, *Primary Examiner.*